Sept. 1, 1953 F. J. BILEK 2,650,807
DRY RENDERING COOKER
Original Filed Dec. 6, 1946 4 Sheets-Sheet 1

INVENTOR.
Frank J. Bilek
BY
Thiess, Olsen & Mecklenburger
Attys.

Sept. 1, 1953 F. J. BILEK 2,650,807
DRY RENDERING COOKER
Original Filed Dec. 6, 1946 4 Sheets-Sheet 2
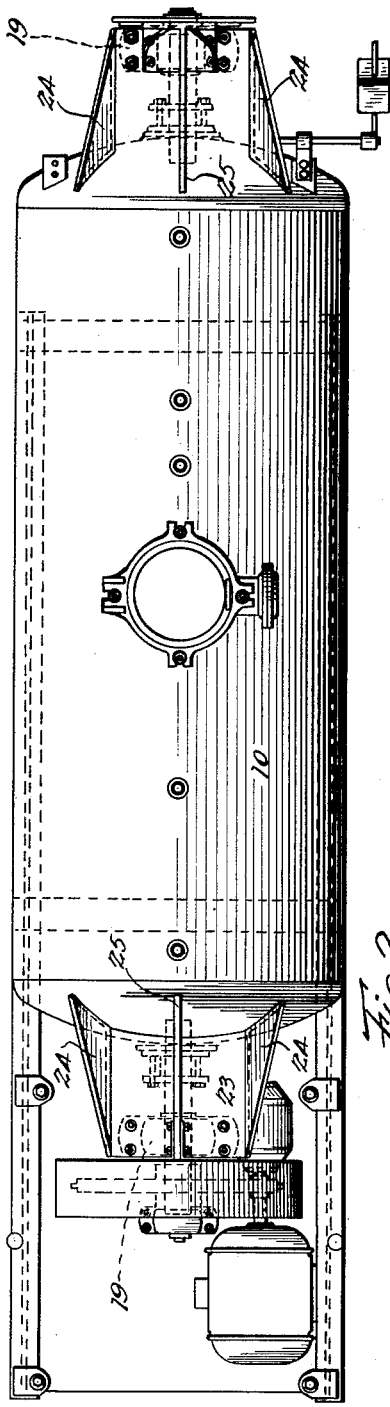
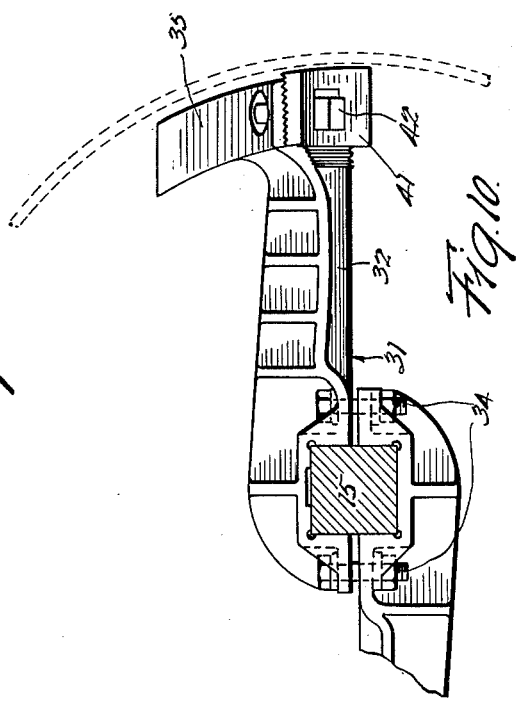
INVENTOR.
Frank J. Bilek
BY
Attys.

PADDLE ACTION WHEN AGITATING

PADDLE ACTION WHEN UNLOADING

INVENTOR.
Frank J. Bilek.
BY
Thiess, Olson & Mecklenburger
Attys.

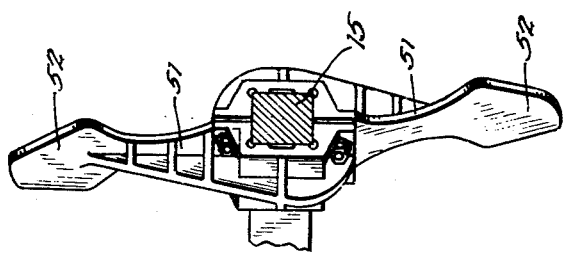
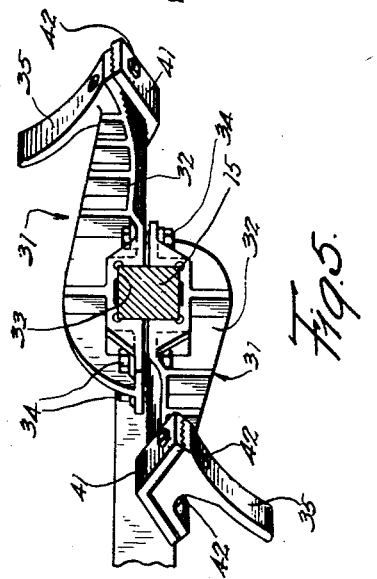
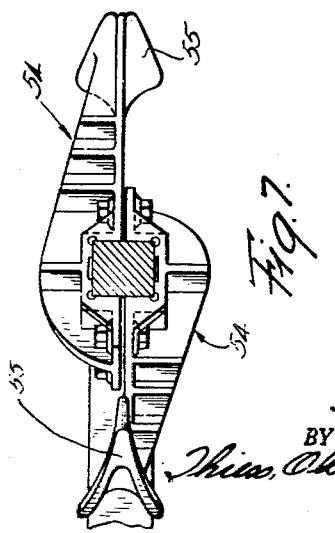

Patented Sept. 1, 1953

2,650,807

UNITED STATES PATENT OFFICE 2,650,807

DRY RENDERING COOKER

Frank J. Bilek, Chicago, Ill., assignor to The Globe Company, Chicago, Ill., a corporation of Illinois Original application December 6, 1946, Serial No. 714,542, now Patent No. 2,603,381, dated July 15, 1952. Divided and this application October 10, 1951, Serial No. 250,660

8 Claims. (Cl. 259—109)

This invention relates to apparatus used in meat-processing plants for rendering the fat from animal matter, usually inedible matter. More specifically it has reference to a so-called "dry rendering cooker" in the form of a vessel having a hollow wall, into which steam is admitted for heating the contents of the vessel to render out the fat, the resultant liquid fat or grease and residual solids being tapped off or drained through suitable openings, whereafter the solids, known as cracklings, are separated from the liquid part in a percolator. The present application is a division of my application Serial No. 714,542, filed December 6, 1946, now Patent No. 2,603,381, dated July 15, 1952.

In order that the contents of the cooker—bones, entrails, and other animal matter—shall be subjected to uniform heating and to shorten the process, the vessel is equipped with a shaft carrying paddles designed to agitate the material, the shaft being carried in bearings mounted on the vessel, and stuffing boxes being provided to seal the shaft with respect to the vessel. The shaft is rotated in any conventional manner.

Prior cookers for the purpose just briefly stated have had the brackets which support the paddle shaft bearings so constructed and secured to the vessel as to virtually surround the stuffing boxes. Accordingly, leakage due to wear of the packing was not readily discernible, and such condition frequently was not brought to the notice of the attendant until belatedly. In the meantime, cooking pressure within the vessel may be below what is intended, and leakage of the grease or fat creates an undesirable situation. Furthermore, unless the stuffing boxes are exposed to the greatest possible extent, access thereto for the purpose of replacing the packing is difficult, and the operation consequently made more time-consuming.

Accordingly, one of the objects of my invention is the provision, in connection with a dry rendering cooker or like equipment, of an outboard bearing construction so arranged that the stuffing box through which the shaft extends is fully exposed on its exterior, not only for purposes of inspection but for ease in maintenance and repair.

As hereinbefore pointed out, the mass of material in the cooker is agitated by a series of paddles secured along the axis of the drive shaft. Inasmuch as the mass is largely solid matter, it is desirable that the paddles be so constructed as to perform their function with minimum friction. Moreover, due to practical manufacturing difficulties in forming a sheet of steel by rolling and welding at the seam, the inner diameter of the vessel cannot be maintained to close tolerances. Accordingly, a set of paddles situated at one point along the axis of the shaft may operate in a portion of the vessel different in diameter than that adjacent another set of paddles.

Hence another object of my invention is to provide a paddle construction for a cooker of the type described equipped with a V-shaped nose for reducing the friction of the paddle through the mass being churned, the nose being radially adjustable with respect to the paddle arm, which adjusting means is not subject to misadjustment while the shaft is rotating.

Cookers of the type to which the present invention relates are provided with a cock through which the liquid fat may be drained off at intervals. However, due to the residual solid matter, i. e., cracklings, accumulated in the lower part of the vessel, it is not possible to empty the vessel through the valve, and a door is provided for this purpose.

In carrying out my invention in one form, I provide a horizontal cylindrical vessel having a hollow wall into which steam is fed for cooking the mass of material. To each end outer wall is secured a bracket having an inverted cantilever form, and to the free end of each bracket is secured a pillow block. Each of the two stuffing boxes through which the horizontally disposed agitator paddle shaft extends to the exterior of the vessel is positioned below a bracket in order that all of the external part of the box is exposed. In another aspect the invention embodies a paddle construction including a portion by which the paddle is secured to the shaft, and an agitating shoe having a V-shaped portion for cleaving the mass of material with minimum friction and maximum agitating effect while the shaft is rotated in one sense, and an arcuately formed camming portion for forcing the cooked material toward the discharge door upon opposite rotation of the shaft.

In the drawings, which show one way in which the invention may be embodied in practice:

Fig. 2 is a plan view thereof;

Fig. 5 is a detail in perspective of one of the central agitator paddle assemblies;

Fig. 6 is a detail in perspective of the front paddle assembly;

Fig. 7 is a detail similar to Fig. 6, but of the rear paddle assembly;

Fig. 10 is a detail view showing the clearance of the paddle with respect to the interior of the vessel.

Figure 1:
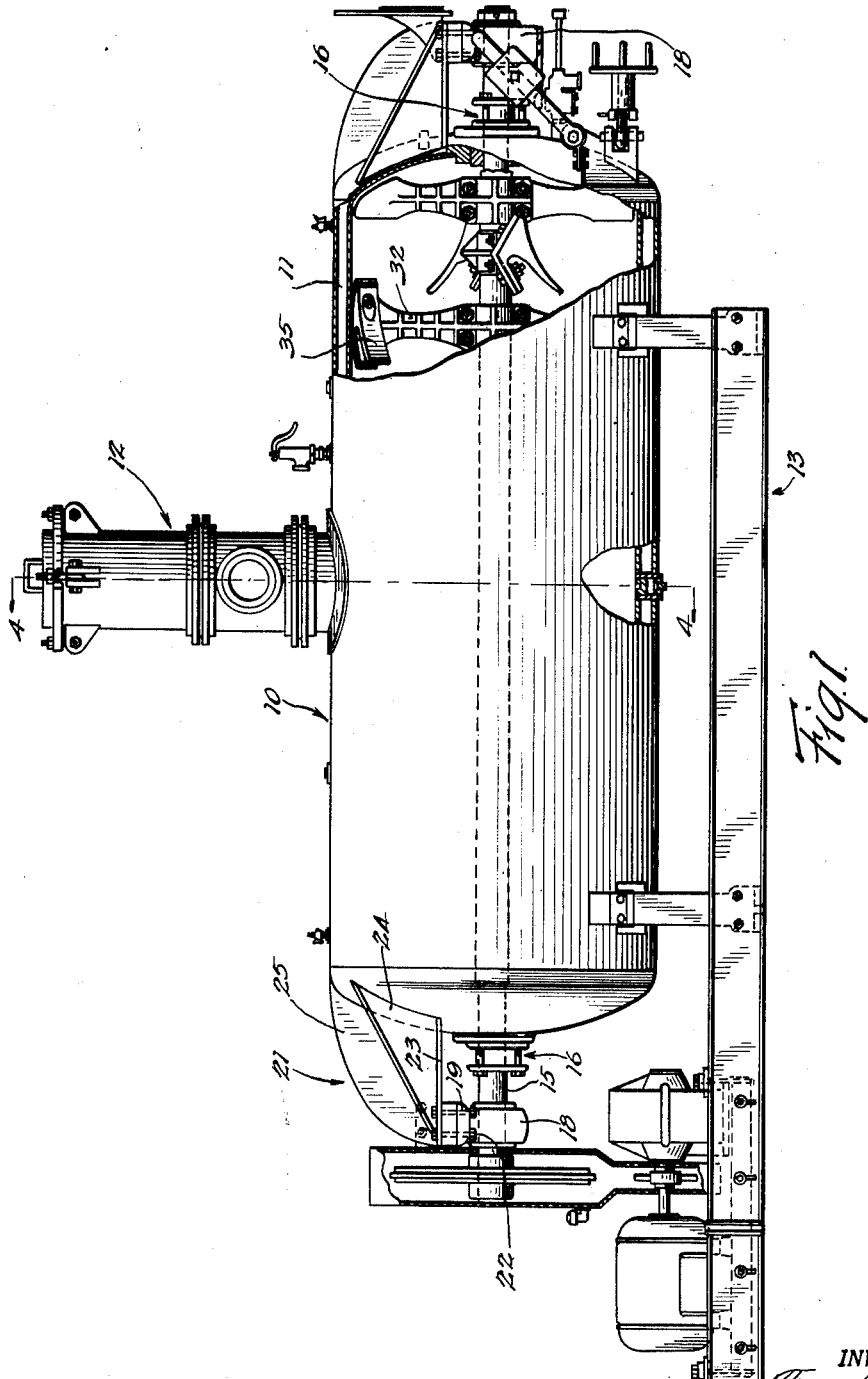
Fig. 1 is a side elevational view of the entire cooker.
Figure 3:
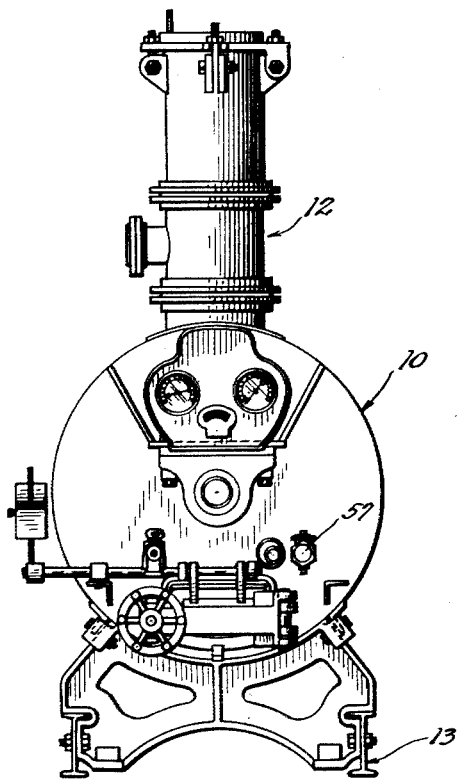
Fig. 3 is a front elevational view thereof.
Figure 4:
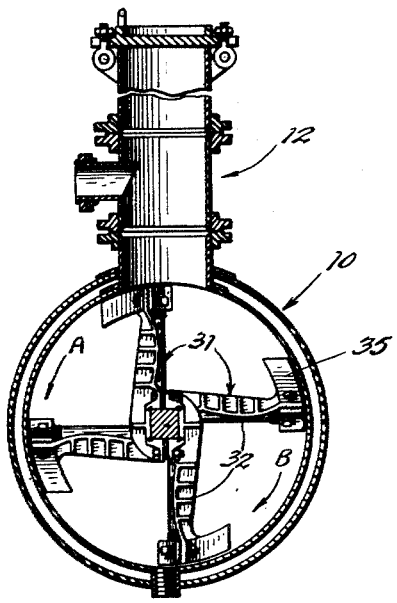
Fig. 4 is a cross-sectional view taken on the line 4—4 of Fig. 1.

In some of the figures parts have been broken away or omitted for clarity.

Referring to Figs. 1 through 4, the cooker comprises a double-walled cylindrical vessel 10, within the jacket 11 of which steam is circulated to cook the animal matter charged through the dome 12, the cooker being supported on a framework 13. Through the end walls of the vessel 10 passes the paddle shaft 15 sealed with respect to the interior of the vessel by stuffing boxes 16—16 of any suitable construction. The foregoing is conventional construction in cookers of the type to which the instant invention is applicable.

In order to support the shaft 15 for rotation, a pair of pillow blocks 18—18 is provided, the base 19 of each block 18 being suspended from a bracket 21 by means of bolts 22. Each bracket 21 includes a horizontally extending plate 23, edge webs 24—24, and a central web 25, all welded together and to the outer wall of the cooker. By reason of the reinforced box-like construction of the brackets 21—21, the pillow blocks 18 are rigidly secured to the vessel while providing freedom of access to and view of the stuffing boxes 16—16. Accordingly, should the packing about the shaft 15 wear to the point where the liquid fat should begin to leak, such condition is easily discernible and may be remedied before the shaft becomes scored or serious waste of fat occurs. Moreover, repacking of the stuffing box is considerably simplified, since the mechanic is not hampered by parts of the bearing-supporting bracket as is the case with prior structures.

The animal matter charged into the vessel is, during the cooking operation, largely converted into fat, the remaining solids being classed as cracklings. To insure the rendering of the solids into liquid fat in a minimum amount of time, and the expenditure of the least steam and power, it is necessary to stir or agitate the contents of the vessel. Such purpose is effected by a plurality of paddles affixed to the shaft 15.

All of the sets of paddles distributed over the major extent of the vessel are identical, while the two endmost sets are slightly different to conform to the dome-like configuration of the ends of the vessel. Therefore, referring to Figs. 1, 4, 5, 6, and 7, the central group comprises pairs of paddles 31, each having an arm 32 of heavy ribbed construction and including a rectangular recess 33 for engagement over the square cross section of the shaft 15 whereby the arm is keyed against rotation relatively to the shaft. Bolts 34 serve to clamp each oppositely disposed pair of arms 32 to the shaft.

Figure 9:
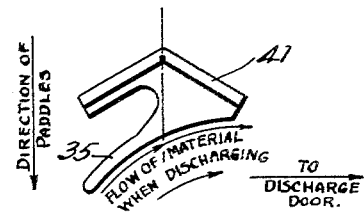
Fig. 9 is a schematic view to indicate the action of the paddle during discharge.

At the outer end of each arm 32 there is provided an arcuate integral member 35 having a curvature generally helically with reference to the cylindrical interior surface of the vessel, best seen in Fig. 1, and a curvature viewed axially, best seen in Fig. 10. After the liquid fat is poured off following the cooking of a batch, it is necessary to force the cracklings and liquid entrapped therein through the discharge door. By rotating the shaft 15 in the direction of the arrow A (Fig. 4), the member 35 will cam the material in the direction of the discharge door (Fig. 9), the action being similar to that of a helicoid conveyor.

To agitate the material during cooking, each arm 32 is provided with an adjustable shoe 41 secured to the arm by bolts 42. Shoe 41 includes a V-shaped working surface, and is serrated on its inner surface to mate with corresponding serrations of the arm 42. Accordingly the shoe 41 may, by loosening the bolts 42, be shifted radially with respect to the arm 32 to position the same where required with reference to the inner face of the vessel. It will be obvious that the clearance between the end face of the shoe and the wall should be as small as possible, so that material which would otherwise tend to adhere to the wall is constantly wiped off and agitated with the remainder of the batch. After the shoe is adjusted radially to a predetermined position and there locked, the interengaging serrations prevent change in such adjustment due to pressure of the agitated mass thereagainst.

Figure 8:
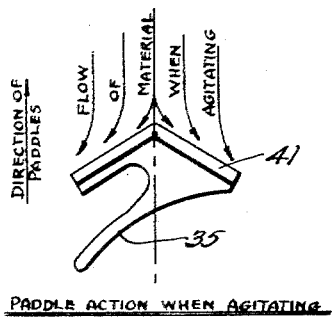
Fig. 8 is a schematic view to indicate the action of the paddle during agitation.

Shoes 41 (Fig. 8) are sloped equally from an apex to form a nose over which the material may flow oppositely to the direction of rotation of the paddles during agitation and with minimum consumption of power. Stated otherwise, the mass of material is cleaved by the rotating nose (arrow B in Fig. 4) rather than thrust, as would be the case with the flat-faced paddle shoes of the prior art.

By reason of the dome-shaped ends of the vessel, the endmost paddles (Figs. 6 and 7) are preferably of different configuration. Turning to Fig. 6, which shows the set of paddles at the front end of the cooker, it will be noted that each arm 51 is provided with a flat paddle 52 whose effective surface is inclined or twisted with reference to a plane through the axis of the shaft 15, that edge of the paddles 52 adjacent the end wall of the vessel having a contour corresponding as closely as possible to the shape of that wall and for the purpose explained in connection with the noses 41, the paddles here performing both agitating and discharging functions.

At the opposite end of the vessel the paddles 54 are of the form shown in Fig. 7, the V-shaped ends thereof performing both agitating and discharging functions. Due to limitations of space it has been found preferable to constitute the ends of paddles 54 as substantially half of the corresponding parts 35 and 41 of the paddles 31, and to omit the feature of adjustability.

As heretofore explained, the larger part of liquid fat portion of the finished batch is drawn off, there being a cock 57 (Fig. 3) just below the horizontal mid-plane of the vessel, the fat pouring therefrom into the percolator pan and thence to a container therebelow. The residue consisting of solid matter together with some liquid is discharged through an opening in the front end of the drum 10 normally closed by a door 62.

From the foregoing it will have been noted that I have provided a dry rendering cooker having many advantages over those presently available. By reason of the inverted bearing construction for the agitator paddle shaft, problems of maintenance of the stuffing boxes are considerably simplified. The novel material-cleaving form of the paddle shoe enables the paddles to agitate the mass of material in the most effective manner and with minimum expenditure of power, while the feature of adjustability allows the shoes to operate close to the inner wall of the vessel and thereby insure that very little, if any, material escapes being mixed with the remainder of the charge.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

Having thus described my invention, what I claim and desire to secure by Letters Patent is:

1. A paddle for agitating the contents of a dry rendering cooker having a central shaft therein rotatable in opposite directions, comprising an arm for being supported at its inner end on said shaft, said arm having adjacent its outer end a V-shaped nose portion at one side and a slanting cam portion at the opposite side for engaging the contents of said cooker upon rotation of said shaft.

2. A paddle for agitating the contents of a dry rendering cooker having a central shaft therein rotatable in opposite directions, comprising an arm for being supported at its inner end on said shaft, said arm having adjacent its outer end a V-shaped nose portion at one side and a substantially arcuate cam portion at the opposite side for engaging the contents of said cooker upon rotation of said shaft, said cam portion having one end projecting further from said nose portion than the other end.

3. A paddle for agitating the contents of a dry rendering cooker having a central shaft therein rotatable in opposite directions, comprising an arm for being supported at its inner end on said shaft, said arm having adjacent its outer end a V-shaped nose portion at one side and a slanting cam portion at the opposite side, said nose and cam portions being so positioned and arranged on said arm that rotation of said arm in one direction about the axis of said shaft causes said nose portion to engage the material in the cooker, and rotation in the opposite direction causes said cam to urge said material in one direction in said container.

4. A paddle for agitating the contents of a dry rendering cooker having a central shaft therein rotatable in opposite directions, comprising an arm for being supported at its inner end on said shaft, said arm having adjacent its outer end a V-shaped nose portion at one side, and a slanting cam portion at the opposite side, at least one of said portions being adjustable with respect to the other longitudinally of said arm.

5. In a dry rendering cooker comprising a substantially cylindrical horizontally arranged container closed at the ends and having a central shaft extending longitudinally thereof rotatable in opposite directions, a paddle comprising an arm connected at its inner end to said shaft and extending generally radially thereof, said arm having at its outer end adjacent the wall of said container a V-shaped nose portion with the apex thereof generally parallel to said arm and located on the leading side thereof when the shaft and arm rotate in one direction, and a slanting cam portion on the opposite side of said arm adjacent the outer end thereof for urging the material toward one end of said container when the shaft and arm are rotated in the oppoiste direction.

6. In a dry rendering cooker comprising a substantially cylindrical horizontally arranged container closed at the ends and having a central shaft extending longitudinally thereof rotatable in opposite directions, a paddle comprising an arm connected at its inner end to said shaft and extending generally radially thereof, said arm having at its outer end adjacent the wall of said container a V-shaped nose portion with the apex thereof generally parallel to said arm and located on the leading side thereof when the shaft and arm rotate in one direction, and a slanting cam portion on the opposite side of said arm adjacent the outer end thereof for urging the material toward one end of said container when the shaft and arm are rotated in the opposite direction, said V-shaped portion being longitudinally adjustable on the said arm.

7. In a dry rendering cooker comprising a substantially cylindrical horizontally arranged container closed at the ends, a central shaft extending longitudinally of said container rotatable in opposite directions, a plurality of arms connected to and extending outwardly from different sides of said shaft and spaced longitudinally therealong, said arms having at their outer ends adjacent the wall of said container V-shaped nose portions with the apices thereof generally parallel to said arms and located on the leading sides thereof when the shaft and arms rotate in one direction, and slanting cam portions on the opposite sides of said arms adjacent the outer end thereof for urging the material toward one end of said container when the shaft and arms are rotated in the opposite direction.

8. A paddle for agitating the contents of a dry rendering cooker having a central shaft therein rotatable in opposite directions, comprising an arm for being supported at its inner end on said shaft, said arm having adjacent its outer end a V-shaped nose portion at one side and a slanting cam portion at the opposite side, said nose and cam portions being so positioned and arranged on said arm that rotation of said arm in one direction about the axis of said shaft causes said nose portion to engage the material in the cooker, and rotation in the opposite direction causes said cam to urge said material in one direction in said container, the outer surfaces of said nose and cam portions opposing the walls of said cooker having a generally helical curve corresponding substantially to the curvature of said cooker.

FRANK J. BILEK.

References Cited in the file of this patent

UNITED STATES PATENTS

| Number | Name | Date |
|---|---|---|
| 1,222,584 | Barr | Apr. 10, 1917 |
| 1,703,543 | Ransohoff | Feb. 26, 1929 |
| 1,796,411 | Shaut | Mar. 17, 1931 |
| 2,014,636 | Rosendahl | Sept. 17, 1935 |
| 2,169,339 | Ditto | Aug. 15, 1939 |